(12) United States Patent
Kanenaga

(10) Patent No.: US 7,551,526 B2
(45) Date of Patent: Jun. 23, 2009

(54) DISK DRIVE APPARATUS AND SPHERICAL ABERRATION CORRECTING METHOD

(75) Inventor: Junichi Kanenaga, Tokyo (JP)

(73) Assignee: Sony Corporation, Tokyo (JP)

( * ) Notice: Subject to any disclaimer, the term of this patent is extended or adjusted under 35 U.S.C. 154(b) by 529 days.

(21) Appl. No.: 11/278,572

(22) Filed: Apr. 4, 2006

(65) Prior Publication Data

US 2006/0221782 A1    Oct. 5, 2006

(30) Foreign Application Priority Data

Apr. 4, 2005    (JP)    ............................ P2005-107176

(51) Int. Cl.
*G11B 7/00*    (2006.01)
(52) U.S. Cl. ............ 369/44.23; 369/44.32; 369/112.02; 369/112.23
(58) Field of Classification Search ........................ None
See application file for complete search history.

(56) References Cited

U.S. PATENT DOCUMENTS 7,286,153 B1 * 10/2007 Sugiyama et al. ........... 347/224

2002/0195540 A1    12/2002 Higuchi
2003/0007431 A1 *   1/2003 Tateishi ................... 369/44.23

OTHER PUBLICATIONS

European Search Report dated Jul. 7, 2007.

* cited by examiner

*Primary Examiner*—Muhammad N. Edun
(74) *Attorney, Agent, or Firm*—Sonnenschein Nath & Rosenthal LLP

(57) ABSTRACT

A disk drive apparatus includes: an optical pickup irradiating a laser beam onto an optical disk having one or more recording layers through an objective lens and receiving the laser beam reflected from the optical disk; a driving unit moving the objective lens in an optical axial direction of the laser beam to the optical disk in accordance with a driving signal; an interlayer distance measuring unit measuring interlayer distances of a plurality of recording layers of the optical disk; and a spherical aberration correcting unit obtaining a spherical aberration correction value for correcting a spherical aberration due to the objective lens to one of the recording layers of the optical disk. A spherical aberration correction value to another one of the recording layers is obtained on the basis of the measured interlayer distances and the obtained spherical aberration correction value to the one recording layer.

4 Claims, 9 Drawing Sheets

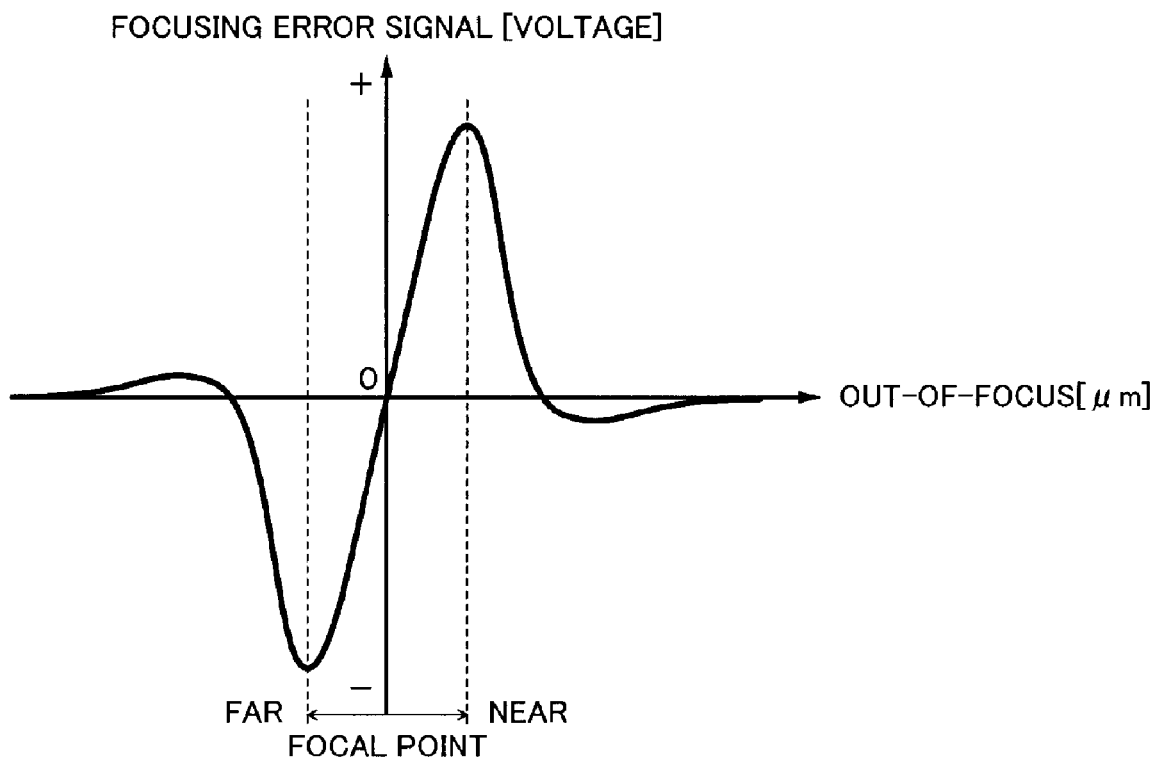

DISK DRIVE APPARATUS AND SPHERICAL ABERRATION CORRECTING METHOD

CROSS REFERENCES TO RELATED APPLICATIONS

The present invention contains subject matter related to Japanese Patent Application No. 2005-107176 filed in the Japanese Patent Office on Apr. 4, 2005, the entire contents of which being incorporated herein by reference.

BACKGROUND OF THE INVENTION

1. Field of the Invention

The invention relates to a disk drive apparatus and a spherical aberration correcting method which are suitable for use in an optical disk having a plurality of recording layers.

2. Description of the Related Arts

In recent years, as a recording medium for recording digital data, a recordable type optical disk is generally used. In the field of the optical disk, a plurality of kinds of recordable optical disks having different physical characteristics while keeping reproduction compatibility have been developed and put into practical use. Since those plurality of kinds of recordable optical disks have a recording capacity which is equivalent to that of a read only optical disk and also have the reproduction compatibility, they have rapidly been spread.

As such recordable optical disks, there are a CD-R (Compact Disc-Recordable) and a CD-RW (Compact Disc-Re-Writable) as disks which conform with the standard of the CD (Compact Disc), and a DVD-R (DVD Recordable), a DVD+R (DVD +R format), a DVD-RW (DVD Re-Writable), a DVD+RW (DVD +RW format), and the like have been well-known as disks which conform with the standard of the DVD (Digital Versatile Disc). Since a recording capacity of the disk of the type which conforms with the standard of the DVD is large to be 4.7 GB (Giga bytes) or more, it is particularly remarkably spread.

In recent years, in association with a request to further increase the recording capacity in the market, the realization of the recordable type disks as products is progressing even with respect to the optical disk having a plurality of recording layers which has been used in the past only in the read only optical disk. A DVD-R double-layered disk is known as a recordable optical disk having a plurality of recording layers.

The recording and reproduction of data onto/from the optical disk are executed by irradiating a laser beam onto the recording layer of the optical disk from an optical pickup. That is, the laser beam is converged onto the recording layer and a light spot is formed on the recording layer. Upon recording, a recording mark is formed by altering a recording film by energy of the laser beam. Upon reproduction, the reflection light of the laser beam from the recording layer is detected by a photodetector and the recording mark (pit) is read. In the case of the DVD, a track pitch is set to about 0.74 μm and a diameter of the light spot which is formed on the recording layer is set to, for example, about 0.89 μm.

In the optical pickup, the laser beam is irradiated from a laser beam source, enters an objective lens through abeam splitter or the like, and is converged by the objective lens, thereby forming the light spot onto the recording layer of the optical disk. An image of the light spot is deformed by a spherical aberration which is caused by optical imperfection of the objective lens. For example, in the case of executing the recording and reproduction of the DVD, since it is necessary to form the light spot having the micro diameter as mentioned above onto the recording layer, it is desirable to correct the spherical aberration.

To correct the spherical aberration, there is generally used a method whereby, for example, a liquid crystal optical device on which concentric patterns have been formed is arranged on a position of the objective lens opposite to the disk surface side and transmittance of the liquid crystal device is concentrically controlled on the basis of a predetermined correction value. As a correction value, for example, it is possible to use a value obtained by measuring a reproduction jitter, an amplitude of a reproduction RF signal, a push-pull signal by a 2-split photodetector, or the like. In such a case, it is necessary to separately execute the recording/reproducing operation in order to obtain the correction value.

Since the laser beam enters a transmission layer (substrate), is refracted in a predetermined direction, and is irradiated to the recording layer, an adjustment value of the spherical aberration can be determined in accordance with a thickness of transmission layer. A method whereby the thickness of transmission layer is measured by a focusing search and used for correction of the spherical aberration has been proposed in JP-A-2003-91851.

SUMMARY OF THE INVENTION

The case of executing the recording and reproduction of an optical disk having a plurality of recording layers, for example, two recording layers of an L0 layer and an L1 layer will be considered here. In such a case, since a distance from the disk surface to the recording layer in the case of the L0 layer and that of the L1 layer are different, even if the adjustment is made so as to minimize the spherical aberration in one of the recording layers, the best adjustment value in the other recording layer differs from the best adjustment value in the one recording layer. It is, therefore, necessary to adjust the spherical aberration every recording layer.

In the case of the DVD having the single recording layer, the thickness of transmission layer is set to 600 μm±10 μm. If an error for the thickness of 600 μm lies within a range of ±10 μm, even if the adjustment value is mechanically determined for the thickness of 600 μm, there is no problem. However, for example, in the double-layered disk of the DVD, since an interval between the two recording layers is set to about 60 μm and a difference of a value which is difficult to be ignored occurs between the best adjustment values in the two recording layers, it is necessary to make the adjustment with respect to each layer. In the adjustment by the correction value as mentioned above, since the recording and reproduction for obtaining the correction value need to be executed every adjustment, in the case of the disk having a plurality of recording layers, there is a problem that it takes a long time for the adjustment.

For example, when the optical disk having the two recording layers such as L0 layer and L1 layer is loaded into an optical disk drive, first, the optical disk drive makes focusing control so that a light spot is formed on the L0 layer. After that, the recording and reproduction for obtaining the correction value are executed and the correction value is measured. Subsequently, similarly, the optical disk drive makes focusing control so that a light spot is formed on the L1 layer. After that, the recording and reproduction for obtaining the correction value are executed again and the correction value is measured.

A method whereby a predetermined spherical aberration error signal is formed and the spherical aberration is dynamically corrected on the basis of this error signal has also been proposed. In such a case, however, there is a problem that a construction of the apparatus becomes complicated and costs increase.

It is, therefore, desirable to provide a disk drive apparatus and a spherical aberration correcting method, in which when a disk having a plurality of recording layers is used, spherical aberration correction can be made in a short time by a simple construction.

To solve the above problems, according to an embodiment of the invention, there is provided a disk drive apparatus comprising: an optical pickup irradiating a laser beam onto an optical disk having one or more recording layers through an objective lens and receiving the laser beam reflected from the optical disk; a driving unit moving the objective lens in an optical axial direction of the laser beam to the optical disk in accordance with a driving signal; an interlayer distance measuring unit measuring interlayer distances of a plurality of recording layers of the optical disk; and a spherical aberration correcting unit obtaining a spherical aberration correction value for correcting a spherical aberration due to the objective lens to one of the plurality of recording layers, wherein a spherical aberration correction value to another one of the plurality of recording layers is obtained on the basis of the interlayer distance measured by the interlayer distance measuring unit and the spherical aberration correction value to the one recording layer obtained by the spherical aberration correcting unit.

According to another embodiment of the invention, there is provided a spherical aberration correcting method comprising: a step of irradiating a laser beam onto an optical disk having a plurality of recording layers through an objective lens by an optical pickup and receiving the laser beam reflected from the optical disk; an interlayer distance measuring step of measuring interlayer distances of the plurality of recording layers of the optical disk; and a spherical aberration correcting step of obtaining a spherical aberration correction value for correcting a spherical aberration due to the objective lens to one of the plurality of recording layers, wherein a spherical aberration correction value to another one of the plurality of recording layers is obtained on the basis of the interlayer distance measured in the interlayer distance measuring step and the spherical aberration correction value to the one recording layer obtained in the spherical aberration correcting step.

As mentioned above, according to an embodiment of the invention, the interlayer distances of the plurality of recording layers of the optical disk having the plurality of recording layers are measured. The spherical aberration correction value for correcting the spherical aberration due to the objective lens to one of the plurality of recording layers is obtained. The spherical aberration correction value to another one of the plurality of recording layers is obtained on the basis of the interlayer distances and the spherical aberration correction value to the one recording layer. Therefore, a time of the spherical aberration correcting process to the optical disk having the plurality of recording layers is shortened.

According to an embodiment of the invention, the interlayer distances of the plurality of recording layers of the optical disk having a plurality of recording layers are obtained. The spherical aberration correction value to the one recording layer is obtained. The spherical aberration correction value to the other recording layer is obtained on the basis of the spherical aberration correction value obtained to the one recording layer and the interlayer distances. Therefore, there is an effect that a time which is necessary for the spherical aberration correction can be shortened.

Thus, there is an effect that an activating time of the optical disk drive apparatus can be shortened.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a schematic diagram showing a change in an example of a focusing error signal;

DETAILED DESCRIPTION OF THE PREFERRED EMBODIMENT

An embodiment of the invention will be described hereinbelow. In the invention, when an optical disk having a plurality of recording layers is loaded into a drive, interlayer distances of a plurality of recording layers are obtained on the basis of a focusing error signal obtained by a focusing search. Spherical aberration (SA) correction adjustment is made with respect to one of a plurality of recording layers. A spherical aberration correction adjustment value in the other recording layer is determined on the basis of the result of the spherical aberration correction adjustment to one recording layer and the interlayer distances of the plurality of recording layers. Since it is sufficient to make the spherical aberration correction adjustment merely to one recording layer, a time which is necessary for the spherical aberration correction adjustment can be shortened.

Figure 1:
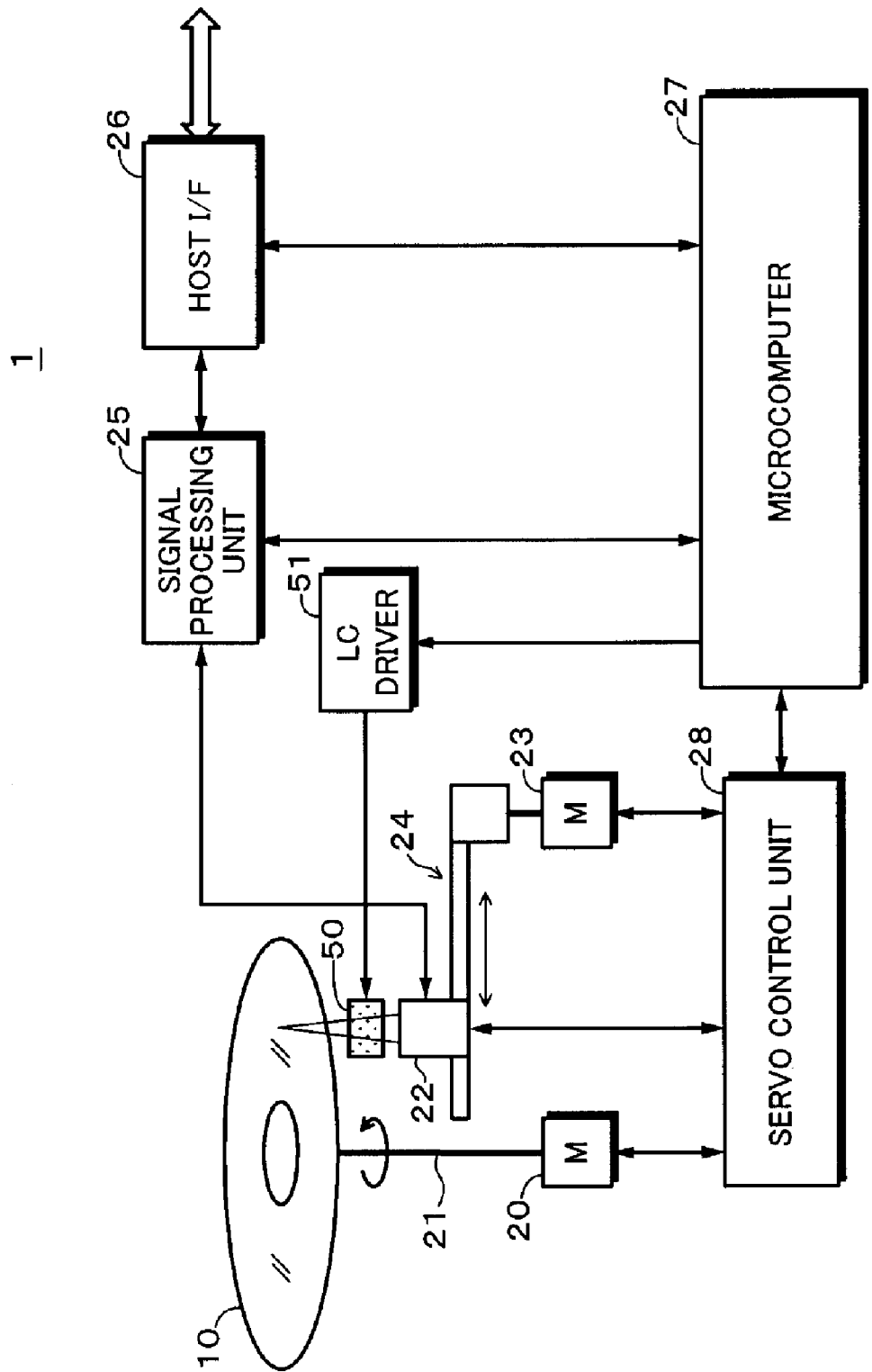
FIG. 1 is a block diagram showing a construction of an example of an optical disk drive apparatus which can be applied to an embodiment of the invention.

FIG. 1 shows a construction of an example of an optical disk drive apparatus 1 which can be applied to the embodiment of the invention. The whole operation of the optical disk drive apparatus 1 is controlled by a microcomputer 27. The microcomputer 27 is constructed by, for example, a microprocessor and controls the operation of the optical disk drive apparatus 1 on the basis of a program which has previously been stored in a ROM (Read Only Memory) (not shown) by using a RAM (similarly, not shown) as a work memory. It is preferable to use an EEPROM (Electrically Erasable Programmable Read Only Memory) or the like, as a ROM, in which data is rewritable is used because the program stored in the ROM can be updated. Therefore, it such an EEPROM. The program data which is updated is supplied from, for example, a host I/F (interface) 26.

An optical disk 10 is fitted to a shaft 21 of a spindle motor 20 by a clamping mechanism (not shown) and can be rotated by the spindle motor 20.

An optical pickup 22 is arranged at a position which faces the recording surface of the optical disk 10. The optical pickup 22 is put on a sled 24 which can be moved in the radial direction of the optical disk 10 by a sled motor 23 and is moved in the radial direction of the optical disk 10 together with the sled 24.

The optical pickup 22 has a laser beam source, a beam splitter, a photodetector, an objective lens, an actuator to make the objective lens movable, and the like.

A laser beam emitted from the laser beam source is transmitted through the beam splitter, converged by the objective lens through a liquid crystal optical device 50 which is driven by a liquid crystal driver 51 under the control of the microcomputer 27, and irradiated onto the recording surface of the optical disk 10.

The laser beam is reflected by the recording surface of the optical disk 10, enters the beam splitter through the objective lens, is reflected by the beam splitter, and reaches the photodetector. The photodetector outputs a signal corresponding to intensity of the incident laser beam.

The actuator is driven by a servo control unit 28 under the control of the microcomputer 27 and moves the objective lens in the optical axial direction and the direction (disk radial direction) perpendicular to the optical axis. By moving the objective lens in the optical axial direction by the actuator, focusing control is made. By moving the objective lens in the radial direction of the optical disk 10, tracking control is made.

An output of the optical pickup 22 is supplied to a signal processing unit 25. The signal processing unit 25 forms a focusing error signal, a tracking error signal, and the like on the basis of the output of the optical pickup 22 and supplies them to the microcomputer 27. The microcomputer 27 supplies a control signal to the servo control unit 28 on the basis of the focusing error signal and the tracking error signal. The servo control unit 28 makes various kinds of servo control such as spindle servo, sled servo, servo (focusing servo, tracking servo) for the objective lens, and the like on the basis of the supplied control signal.

The microcomputer 27 properly obtains a correction value on the basis of the output of the optical pickup 22. On the basis of the correction value, the microcomputer 27 corrects the spherical aberration which is caused when the laser beam is irradiated onto the recording layer of the optical disk 10. The spherical aberration correction is made by, for example, a method whereby the liquid crystal optical device 50 is driven by controlling the liquid crystal driver 51 and the intensity of the laser beam is partially controlled. The spherical aberration correction can be also made by moving the objective lens in the optical axial direction by the actuator. Further, the spherical aberration correction can be also made by a combination of those two methods.

It has been known that there is a correlation between the spherical aberration and the reproduction jitter, the amplitude of the reproduction RF signal, the push-pull signal by the photodetector, or the like. Therefore, the correction value can be obtained by, for example, a method whereby the trial writing is executed by using a non-recording portion or the like in a PCA (Power Calibration Area) or a lead-in area which is arranged on the inner rim side of the optical disk 10 and the reproduction jitter, RF signal, push-pull signal, or the like is measured on the basis of a reproduction signal of the non-recording portion.

For example, in the case of using the reproduction jitter as a correction value, the liquid crystal driver 51 is controlled so as to drive the liquid crystal optical device 50 in such a direction as to reduce the reproduction jitter. In the case of using the amplitude of the RF signal or the push-pull signal as a correction value, the liquid crystal driver 51 is controlled in such a direction as to maximize them. A control value (hereinbelow, referred to as a spherical aberration correction value) used to correct the spherical aberration is stored in, for example, the RAM provided in the microcomputer 27.

If the optical disk 10 loaded into the optical disk drive apparatus 1 is a double-layered disk having two recording layers, an interlayer distance between the two recording layers can be obtained on the basis of the focusing error signal and a driving signal to drive the actuator in the optical axial direction although the details will be explained hereinafter. On the basis of the interlayer distance and the spherical aberration correction value obtained by the spherical aberration correction made to one of the two recording layers as mentioned above, the microcomputer 27 obtains a spherical aberration correction value in the other recording layer. As a method of obtaining such a spherical aberration correction value, for example, there is a method whereby a table showing the relation between the spherical aberration correction value in one recording layer and the interlayer distance is preliminarily stored in the ROM and the spherical aberration correction value in the other recording layer is obtained with reference to such a table. Such a value may be also obtained by a calculation.

Upon recording, the signal processing unit 25 executes an error correction encoding process, a recording encoding process, and the like to the recording data supplied through the host I/F 26 and further executes predetermined signal processes such as a modulating process and the like, thereby forming a recording signal. The recording signal is supplied to the optical pickup 22 and modulated into the laser beam. Upon reproduction, the signal processing unit 25 executes predetermined processes such as RF signal process, binarizing process, PLL (Phase Locked Loop) synchronizing process, a decoding process of a recording code, and the like to the signal outputted from the optical pickup 22 and extracts digital data. The digital data outputted from the signal processing unit 25 is transferred to an external apparatus through the host I/F 26.

Figure 2:
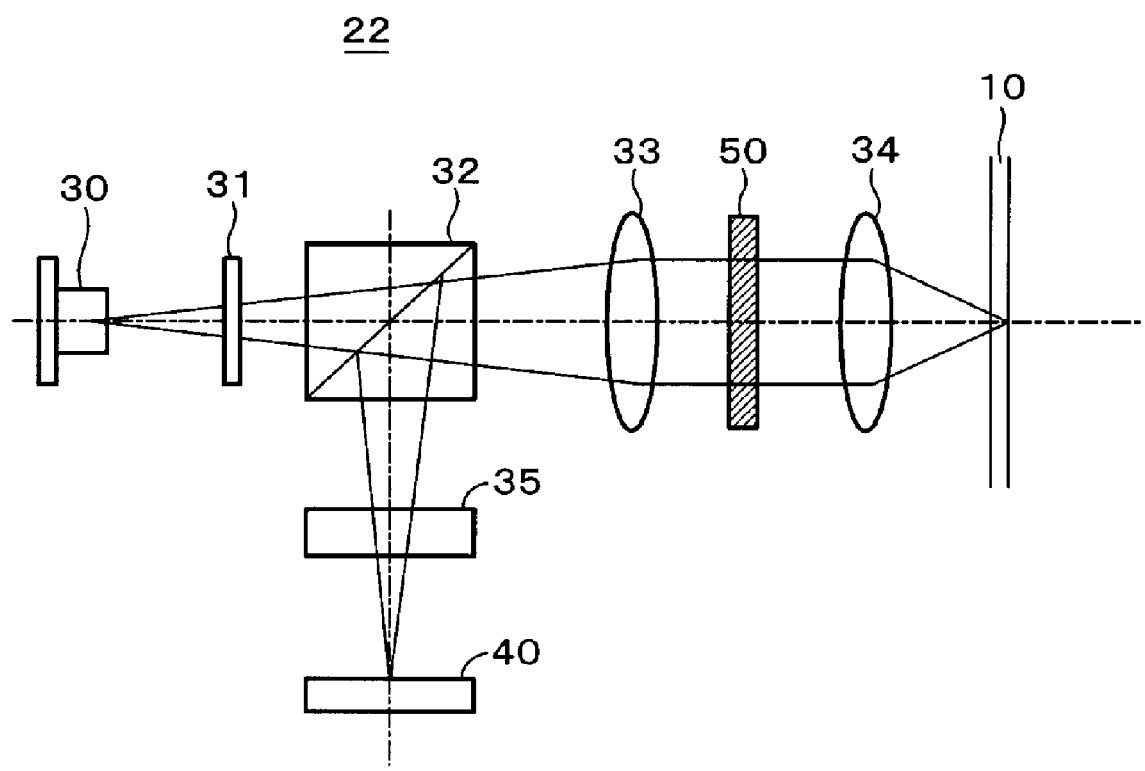
FIG. 2 is a schematic diagram conceptually showing an optical path of an example in an optical pickup.

FIG. 2 conceptually shows an optical path of an example in the optical pickup 22. The laser beam emitted from a laser beam source 30 constructed by a laser diode is divided into a main beam constructed by 0-th order light and two side beams constructed by primary light by, for example, a grating 31 and they enter a collimator lens 33 through a beam splitter 32. The laser beam is converted into parallel light by the collimator lens 33, enters an objective lens 34 through the liquid crystal optical device 50, is converged by the objective lens 34, and is irradiated onto the recording surface of the optical disk 10. The laser beam is reflected by the recording surface of the optical disk 10 and enters the beam splitter 32 through the objective lens 34 and the collimator lens 33. The reflected laser beam is reflected by the beam splitter 32 in a predetermined direction and enters a photodetector 40 through a cylindrical lens 35. The photodetector 40 is, for example, a 4-split photodetector whose photosensitive surfaces are divided into four areas by two lines which cross perpendicularly.

Figure 3A:
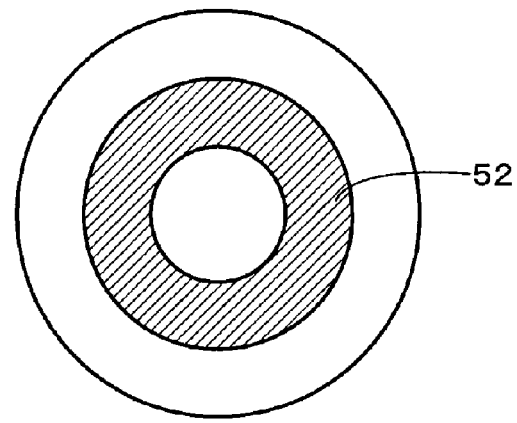
FIGS. 3A to 3D are schematic diagrams for explaining correction adjustment of a spherical aberration by a liquid crystal optical device.
Figure 3B:
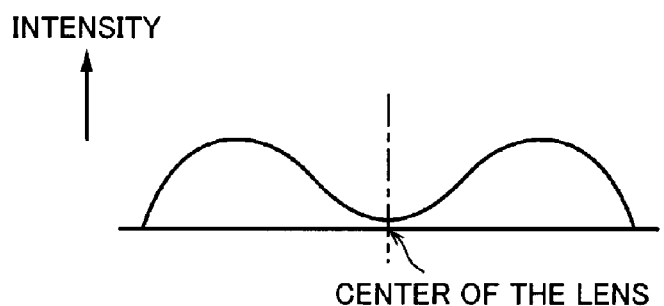
Figure 3C:
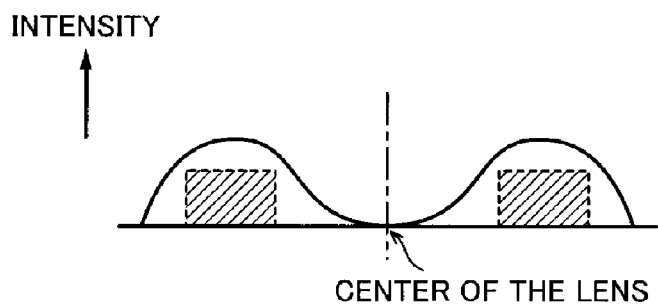
Figure 3D:
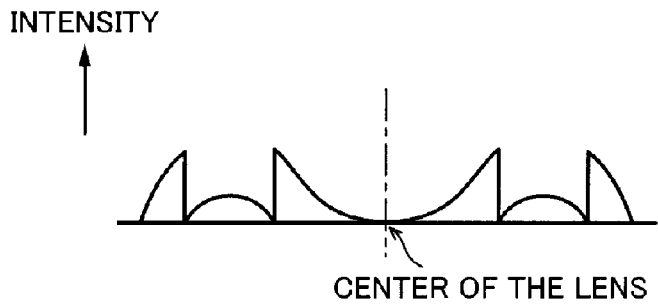

An outline of the correction adjustment of the spherical aberration by the liquid crystal optical device 50 will now be described with reference to FIGS. 3A to 3D. For example, as shown in an example in FIG. 3A, the liquid crystal optical device 50 is constructed in such a manner that a concentric pattern 52 is arranged, a transmittance of the portion of the pattern 52 is changed by orienting the liquid crystal by applying an electric field on the basis of the pattern 52, and an intensity of the laser beam which is transmitted through the liquid crystal optical device 50 is partially changed. For example, if an intensity variation of the laser beam due to the spherical aberration exists as shown in FIG. 3B, the transmittance is partially controlled by the liquid crystal optical device 50, thereby attenuating the intensity of the laser beam by an amount schematically shown in a hatched region in FIG. 3C. Thus, the intensity of the laser beam is uniformed as schematically shown in FIG. 3D as compared with that shown in the example of FIG. 3B, so that the spherical aberration correction is made.

Subsequently, an example of the focusing error detection by an astigmatism method will be schematically explained with reference to FIGS. 4 to 6. As schematically shown in FIG. 4, the laser beam reflected by the optical disk 10 is reflected by the beam splitter 32 and received by the photodetector 40 through the cylindrical lens 35.

As is well-known, the cylindrical lens 35 has a lens function only in one direction (y direction in the example of FIG. 4) of the light flux. Therefore, although a focal area converted by the cylindrical lens 35 occurs at a point B, this focal area does not become a point but becomes a straight line in the y direction (actually, an elliptic shape extending in the y direction). When the light passes through the point B, the light flux in the x direction is extended and coincides with an extent in the y direction at a point j and the focal area becomes a circular shape. After that, only the light flux in the y direction is converged and focused in a straight line in the x direction (actually, an elliptic shape extending in the x direction) at a point A.

Figure 5A:
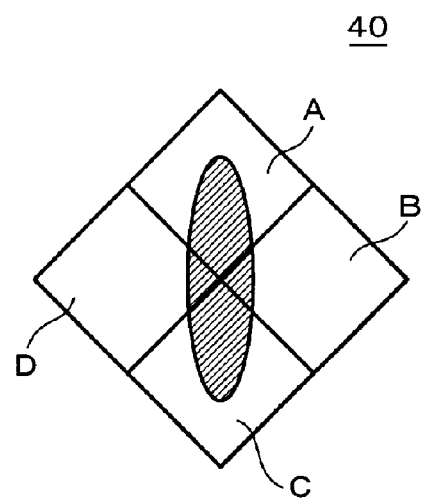
FIGS. 5A to 5C are schematic diagrams showing a state of light reception of a laser beam by a photodetector.
Figure 5B:
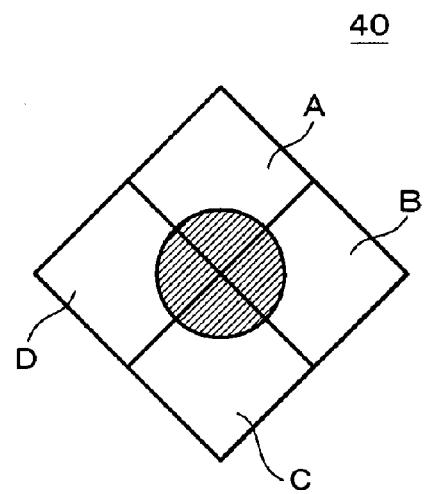
Figure 5C:
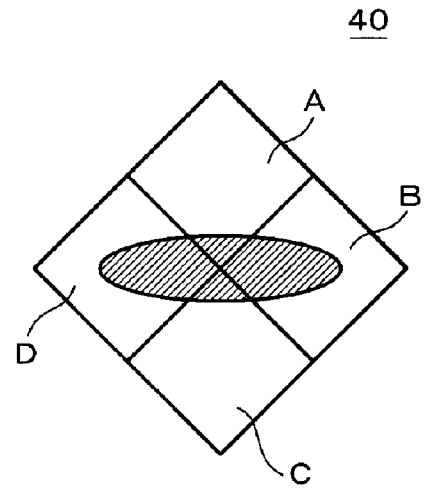

FIGS. 5A to 5C schematically show the state where the laser beam is received by the photodetector 40 through the cylindrical lens 35 as mentioned above. In FIGS. 5A to 5C, for convenience of explanation, the four divided photosensitive surfaces of the photodetector 40 are labeled to A, B, C, and D, respectively.

Figure 4:
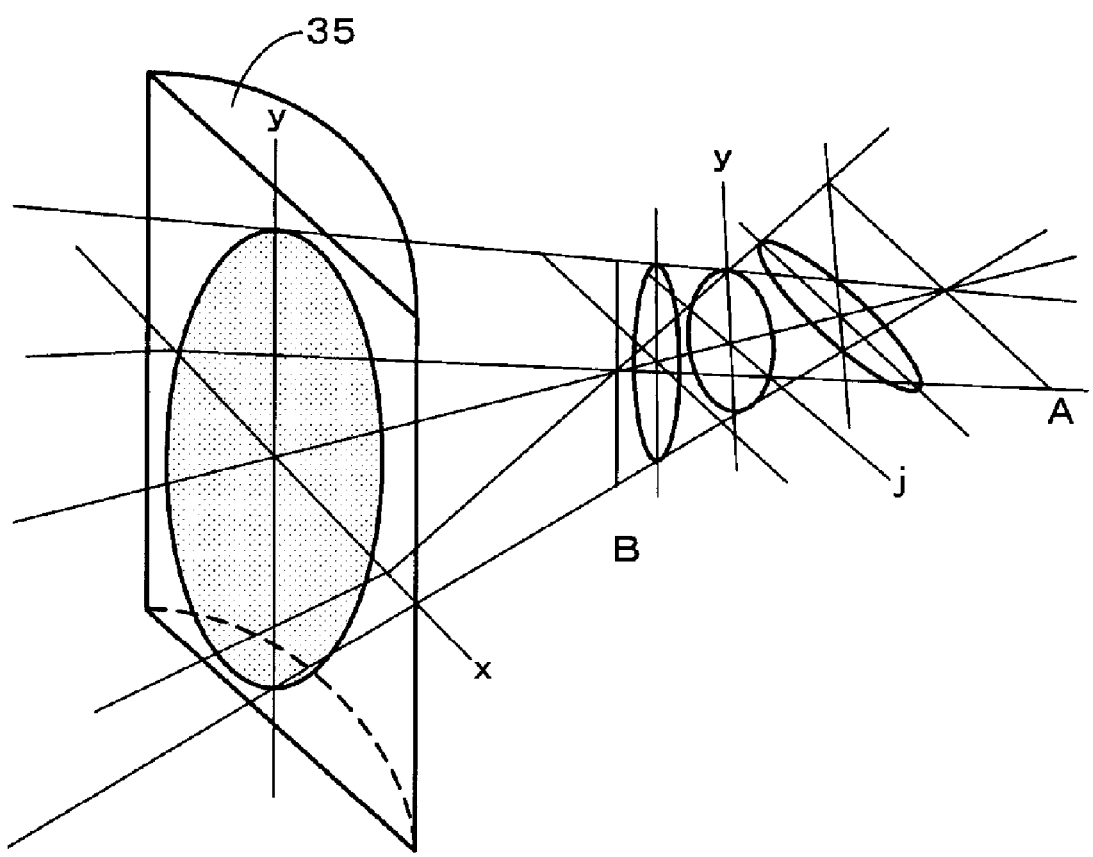
FIG. 4 is a schematic diagram showing a light flux of an example according to a cylindrical lens.

When the optical disk 10 and the objective lens 34 are closer than the focal position, the photodetector 40 receives the laser beam in the state at the point B in FIG. 4. As shown in FIG. 5A, the laser beam is received in an elliptic shape extending in the y direction by the photosensitive surfaces of the photodetector 40. For example, the distance between the optical disk 10 and the objective lens 34 is gradually increased from this state, the laser beam is received by the photodetector 40 in the state at the point j in FIG. 4 at the focal position. As shown in FIG. 5B, the laser beam is received in a circular shape by the photosensitive surfaces of the photodetector 40. When the distance between the optical disk 10 and the objective lens 34 is further increased, the laser beam is received by the photodetector 40 in the state at the point A in FIG. 4. As shown in FIG. 5C, the laser beam is received by the photosensitive surfaces of the photodetector 40.

According to the astigmatism method, by using detection outputs from the four divided photosensitive surfaces A to D of the photodetector 40, the focal position is discriminated on the basis of a differential output $D_{pp}$ between the photosensitive surfaces (A and C) in the diagonal direction and the photosensitive surfaces (B and D) in the diagonal direction as shown in the following equation (1).

$$D_{pp}=(A+C)-(B+D) \quad (1)$$

That is, when the light spot exists at the focal position, since the laser beam is received in a circular shape by the photosensitive surfaces of the photodetector 40 as shown in FIG. 5B, a value of the differential output $D_{pp}$ is equal to 0.

For example, by checking a change in the value of the differential output $D_{pp}$ while properly moving the objective lens 34 in the optical axial direction by the actuator, a zero-crossing point of the value of the differential output $D_{pp}$ is detected and set to the focal position. FIG. 6 shows a change in an example of the differential output $D_{pp}$, that is, the focusing error signal, when the position of the objective lens 34 is moved. As mentioned above, the focusing error signal draws an S-character curve which has positive and negative peaks at the position that is closer to the optical disk 10 than the focal position and at the position that is farther from the optical disk 10 than the focal position and which linearly changes between the positive and negative peaks against the focusing error. The zero-crossing point between the positive and negative peaks in the focusing error signal is detected.

Figure 7:
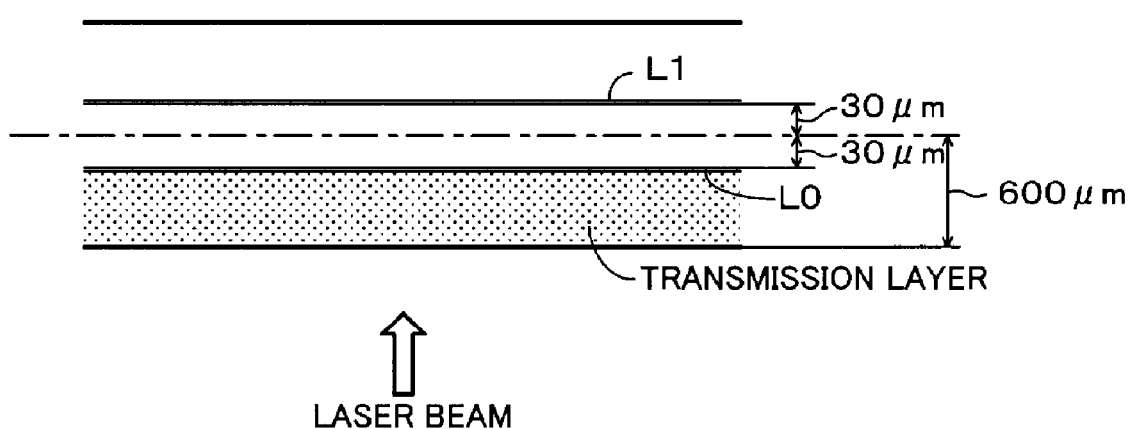
FIG. 7 is a diagram schematically showing a layer structure of a DVD having two recording layers.

FIG. 7 schematically shows a layer structure of a DVD having two recording layers. The optical disk 10 is formed by adhering a substrate having an L0 layer and a substrate having an L1 layer and a distance between the surface and the center of the disk is set to about 600 μm. An intermediate layer between the L0 layer and the L1 layer has a thickness of about 60 μm (55 μm±15 μm). Each of the L0 layer and the L1 layer has a distance of about 30 μm to the center of the disk.

Figure 8:
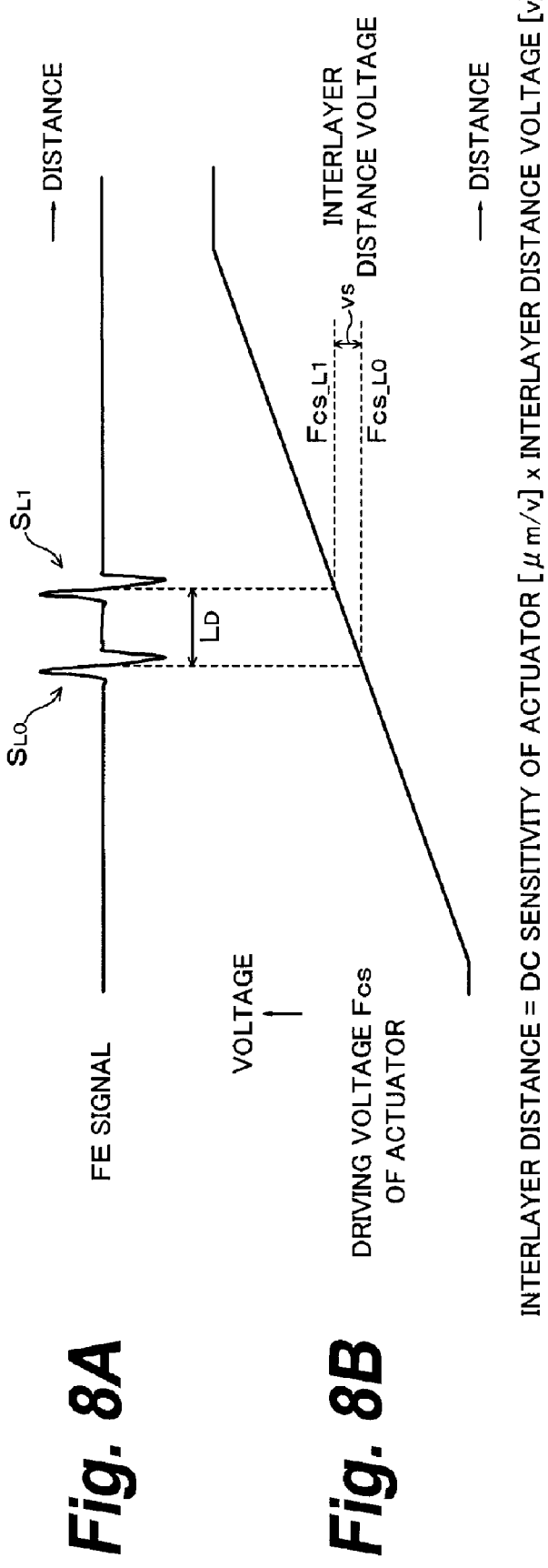
FIGS. 8A and 8B are diagrams schematically showing a method of an example of obtaining interlayer distances by using the focusing error signal.

FIGS. 8A and 8B are diagrams schematically showing a method of an example of obtaining the interlayer distances by using the focusing error signal. In the optical disk drive apparatus 1 in which the reflection light from the optical disk 10 is detected and the focusing operation is executed by using the focusing error signal based on the detected reflection light, before the focusing servo is executed, the focal position is detected by the focusing search and the objective lens 34 is previously moved to a position which is close to the focal position to a certain extent. The focusing search is executed by moving the objective lens 34 in the optical axial direction and detecting the S-character curve of the focusing error signal mentioned above.

For example, in the optical disk 10 having two recording layers, by moving the objective lens 34 in a predetermined range including the L0 and L1 layers, the S-character curves of the focusing error (FE) signal are detected at two positions as shown in an example in FIG. 8A. In the case where the focusing search is executed by moving the objective lens 34 from the laser beam irradiating surface of the optical disk 10, when S-character curve which is detected on the surface of the optical disk 10 is excluded, an S-character curve $S_{L0}$ corresponding to the L0 layer is first detected and an S-character curve $S_{L1}$ corresponding to the L1 layer is subsequently detected.

A driving voltage $F_{CS}$ of the actuator to drive the objective lens 34 in the optical axial direction at the zero-crossing point of each of the S-character curves $S_{L0}$ and $S_{L1}$ is obtained. The actuator moves the objective lens 34 in accordance with the driving voltage $F_{CS}$ as shown in an example in FIG. 8B. Since a DC sensitivity (that is, moving distance per unit voltage) of the actuator has previously been known by the specifications, an interlayer distance $L_D$ between the L0 and L1 layers can be calculated on the basis of a difference between the driving voltages $F_{CS}$ at the zero-crossing points of the S-character curves $S_{L0}$ and $S_{L1}$ and the DC sensitivity of the actuator.

When the driving voltages $F_{CS}$ at the zero-crossing points of the S-character curves $S_{L0}$ and $S_{L1}$ are assumed to be $F_{CS\_L0}$ and $F_{CS\_L1}$ and the DC sensitivity of the actuator is assumed to be $F_{CS\_DC}$, respectively, the interlayer distance $L_D$ between the L0 and L1 layers can be calculated by, for example, the following equation (2).

$$L_D=F_{CS\_DC}\times(F_{CS\_L1}-F_{CS\_L0}) \quad (2)$$

On the basis of the spherical aberration correction value obtained in one recording layer, the spherical aberration correction value in the other recording layer is obtained by using the interlayer distance $L_D$ calculated by the equation (2). For example, the spherical aberration correction value obtained in one recording layer is set to a reference correction value and a predetermined correction value according to the interlayer distance $L_D$ is added to the reference correction value. The correction value to be added is obtained by, for example, a method whereby a table showing a relation between the interlayer distance $L_D$ and the correction value is previously formed and this table is referred to on the basis of the interlayer distance $L_D$ calculated by the equation (2). It can be also obtained by a calculation from the calculated interlayer distance $L_D$.

The microcomputer 27 properly sets the spherical aberration correction values in the L0 and L1 layers obtained in this manner into the liquid crystal optical device 50 for making the spherical aberration correction. For example, the microcomputer 27 generates a command to the liquid crystal driver 51 so as to control the liquid crystal optical device 50 on the basis of the spherical aberration correction value corresponding to either the recording layer L0 or the recording layer L1 to which the recording is executed.

Figure 9:
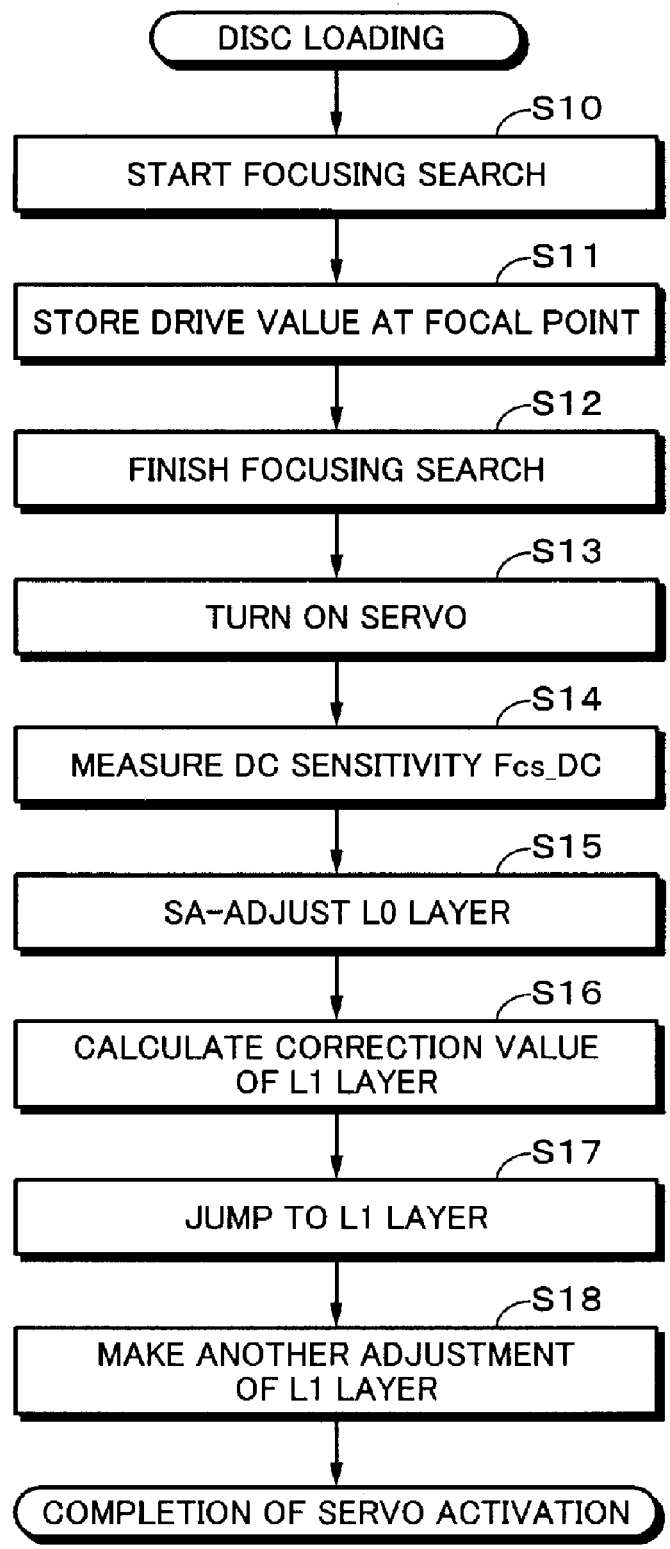
FIG. 9 is a flowchart showing a spherical aberration correcting process of an example according to the embodiment of the invention.

FIG. 9 is a flowchart showing a spherical aberration correcting process of an example according to the embodiment of the invention. When the optical disk 10 is loaded into the optical disk drive apparatus 1, the focusing search operation is started (step S10).

For example, on the basis of the command from the microcomputer 27, the sled motor 23 is driven by the servo control unit 28 and the optical pickup 22 is moved to a predetermined position where the reflection light is obtained from the recording layer of the optical disk 10. The laser beam source 30 is driven by the signal processing unit 25, so that the laser beam is emitted toward the recording layer of the optical disk 10. The actuator of the optical pickup 22 is driven by the servo control unit 28, so that the objective lens 34 is moved in the direction of the optical disk 10 along the optical axis. The laser beam reflected from the recording layer of the optical disk 10 is received by the optical pickup 22, converted into the electric signal, and supplied to the signal processing unit 25.

The microcomputer 27 controls the signal processing unit 25 and the servo control unit 28, detects the first S-character curve $S_{L0}$ and the second S-character curve $S_{L1}$ of the focusing error signal on the basis of the output signal of the optical pickup 22 (refer to FIG. 8A), detects the zero-crossing points of them, and obtains the actuator driving voltages $F_{CS\_L0}$ and $F_{CS\_L1}$ at the zero-crossing points, respectively. The obtained actuator driving voltages $F_{CS\_L0}$ and $F_{CS\_L1}$ are stored into, for example, the RAM provided in the microcomputer 27 (step S11).

When the focusing search is finished (step S12), the objective lens 34 of the optical pickup 22 is moved to a position near the focal position of, for example, the L0 layer. In next step S13, the focusing servo is turned on and the laser beam is focused onto the L0 layer. The DC sensitivity $F_{CS\_DC}$ of the actuator is measured in next step S14.

The DC sensitivity $F_{CS\_DC}$ of the actuator can be measured, for example, as follows. In the state where the focusing servo is ON, a predetermined offset voltage is added to the actuator driving voltage $F_{CS}$ in the in-focus state and a change in the focusing error signal at this time is detected. Since the objective lens 34 is moved by the predetermined offset voltage, the focusing state is deviated and the focusing error signal changes. The offset voltage is set to, for example, a value in a range where the S-character curve has linearity for the out-of-focus state.

The optical pickup 22 has a change amount from the focal point position, as a constant, for a shift amount of the focusing error signal. In the case of the optical pickup 22 as a product, such a constant is provided from, for example, a manufacturing company. The moving distance of the actuator for the unit driving voltage of the actuator, that is, the DC sensitivity $F_{CS\_DC}$ of the actuator can be obtained from a correspondence relation among the offset voltage added to the actuator driving voltage $F_{CS}$, the change amount of the focusing error signal, and the change amount from the focal point position.

For example, assuming that the offset voltage is set to $\Delta F_{CS}$, the change amount of the focusing error signal is set to $\Delta FE$, and the foregoing constant of the optical pickup 22 is set to $\alpha$, the DC sensitivity $F_{CS\_DC}$ can be obtained by the following equation (3).

$$F_{CS\_DC} = (\Delta FE \times \alpha) / \Delta F_{CS} \quad (3)$$

The interlayer distance $L_D$ between the L0 and L1 layers can be obtained by the equation (2) by using the DC sensitivity $F_{CS\_DC}$ obtained as mentioned above and the actuator driving voltages $F_{CS\_L0}$ and $F_{CS\_L1}$ at the focal point obtained in step S11 mentioned above.

In step S15, the objective lens 34 is moved by driving the actuator and the focusing servo is executed so as to focus the laser beam onto the L0 layer. The spherical aberration correction adjustment in the L0 layer is made. As a method of the spherical aberration correction adjustment, the method using the reproduction jitter, the amplitude of the reproduction RF signal, the push-pull signal by the 2-split photodetector, or the like which has already been described as a related art can be used.

In next step S16, the spherical aberration correction value in the L1 layer is obtained on the basis of the spherical aberration correction value in the L0 layer and the interlayer distance $L_D$ obtained in step S14 mentioned above. For example, the spherical aberration correction value in the L1 layer can be obtained with reference to the table which shows the relation between the interlayer distance and the correction value to be added to the spherical aberration correction value in the L0 layer and has previously been stored in the ROM or the like. For example, the correction value obtained on the basis of the interlayer distance $L_D$ with reference to the table is added to the spherical aberration correction value in the L0 layer and the resultant value is set to the spherical aberration correction value of the L1 layer.

The correction value which is added to the spherical aberration correction value in the L0 layer can be also obtained by a calculation.

As necessary, the focal position of the objective lens 34 is moved to the L1 layer by driving the actuator, the liquid crystal optical device 50 is driven on the basis of the spherical aberration correction value in the L1 layer obtained in step S16, and the spherical aberration correction adjustment in the L1 layer is made (step S17). The other adjustment in the L1 layer is made in next step S18. Since the spherical aberration correction value in the L1 layer has already been obtained in step S15 mentioned above, the movement of the focal position from the L0 layer to the L1 layer can be performed in a short time.

When the optical disk 10 is loaded into the optical disk drive apparatus 1, by executing the processes as mentioned above, the activation processing time of the drive can be shortened. Since the process to obtain the spherical aberration correction values can be executed by the method used in the past, the costs of the apparatus do not increase and the control can be also easily made.

Although the invention has been described above with respect to the example in which it is applied to the disk having the two recording layers, the invention is not limited to such an example. That is, the invention can be also applied to a disk having three or more recording layers. In addition, the kind of disk is not limited to the DVD but the invention can be also applied to a disk of any other type.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive apparatus comprising:
   an optical pickup irradiating a laser beam onto an optical disk having one or more recording layers through an objective lens and receiving the laser beam reflected from the optical disk;
   a driving unit moving said objective lens in an optical axial direction of said laser beam to said optical disk in accordance with a driving signal;

an interlayer distance measuring unit measuring interlayer distances of a plurality of recording layers of said optical disk; and a spherical aberration correcting unit obtaining a spherical aberration correction value for correcting a spherical aberration due to said objective lens to one of the plurality of recording layers of said optical disk, wherein, a spherical aberration correction value to another one of said plurality of recording layers is obtained on the basis of the interlayer distance measured by said interlayer distance measuring unit and the spherical aberration correction value to said one recording layer obtained by said spherical aberration correcting unit, said interlayer distance measuring unit measures the interlayer distance by obtaining a movement amount of said objective lens on the basis of said driving signal, and said interlayer distance measuring unit obtains the movement amount of said objective lens on the basis of a correspondence relation between a change in a focusing error signal when said driving signal of said driving unit is changed in a state where a focusing servo has been performed at the focal position and a deviation amount from said focal position corresponding to the change in the focusing error signal.

2. An apparatus according to claim 1, wherein a focusing search is performed with respect to each of said plurality of recording layers of said optical disk and said interlayer distance measuring unit measures the interlayer distances on the basis of said driving signal of said driving unit at the focal position of each of said plurality of recording layers obtained by said focusing search.

3. An apparatus according to claim 1, wherein said spherical aberration correction value to said another recording layer is obtained when said optical disk is loaded.

4. A spherical aberration correcting method comprising:

a step of irradiating a laser beam onto an optical disk having a plurality of recording layers through an objective lens by an optical pickup and receiving the laser beam reflected from said optical disk;

an interlayer distance measuring step of measuring interlayer distances of the plurality of recording layers of said optical disk; and a spherical aberration correcting step of obtaining a spherical aberration correction value for correcting a spherical aberration due to said objective lens to one of the plurality of recording layers of said optical disk, wherein, a spherical aberration correction value to another one of said plurality of recording layers is obtained on the basis of said interlayer distance measured in said interlayer distance measuring step and said spherical aberration correction value to said one recording layer obtained in said spherical aberration correcting step, said interlayer distance measuring unit measures the interlayer distance by obtaining a movement amount of said objective lens on the basis of said driving signal, and said interlayer distance measuring unit obtains the movement amount of said objective lens on the basis of a correspondence relation between a change in a focusing error signal when said driving signal of said driving unit is changed in a state where a focusing servo has been performed at the focal position and a deviation amount from said focal position corresponding to the change in the focusing error signal.

* * * * *